(No Model.) 4 Sheets—Sheet 1.
G. GUIGNARD.
PROCESS OF AND APPARATUS FOR MANUFACTURING PURE YEAST.
No. 471,335. Patented Mar. 22, 1892.
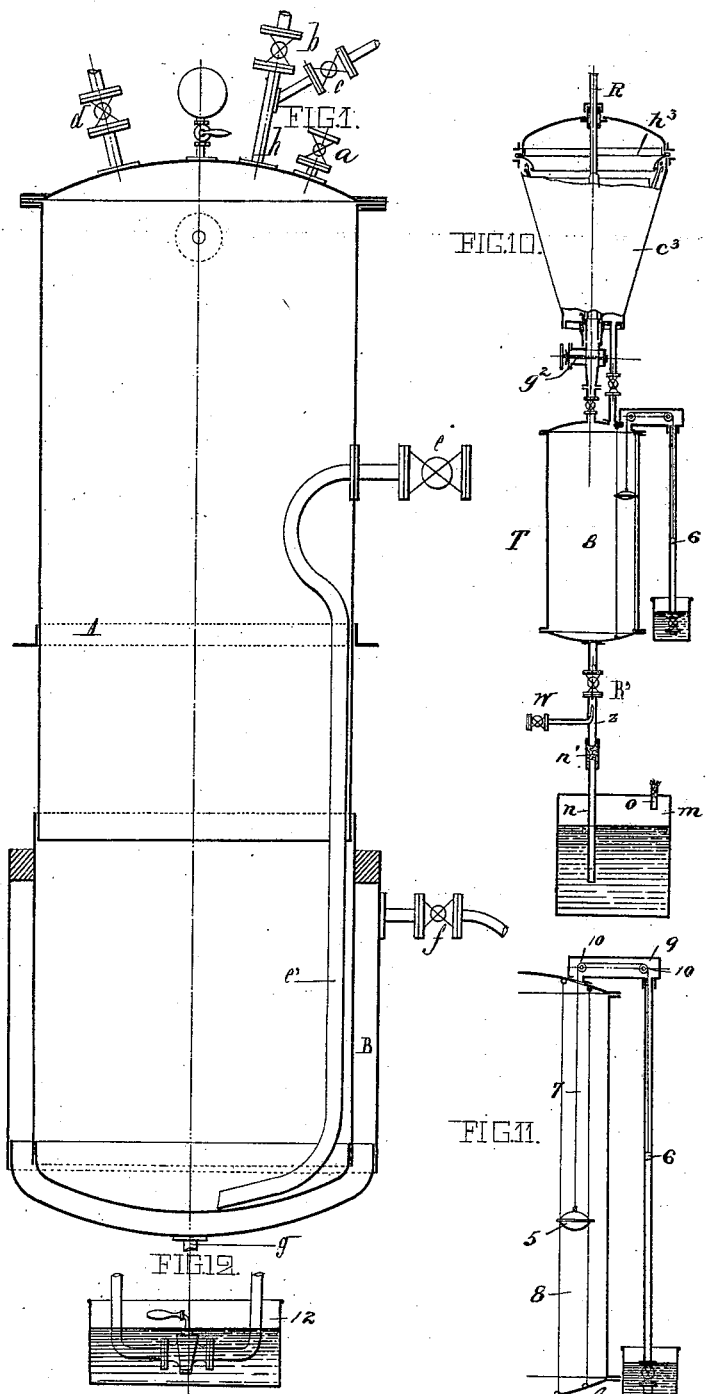

(No Model.) 4 Sheets—Sheet 2.
G. GUIGNARD.
PROCESS OF AND APPARATUS FOR MANUFACTURING PURE YEAST.
No. 471,335. Patented Mar. 22, 1892.
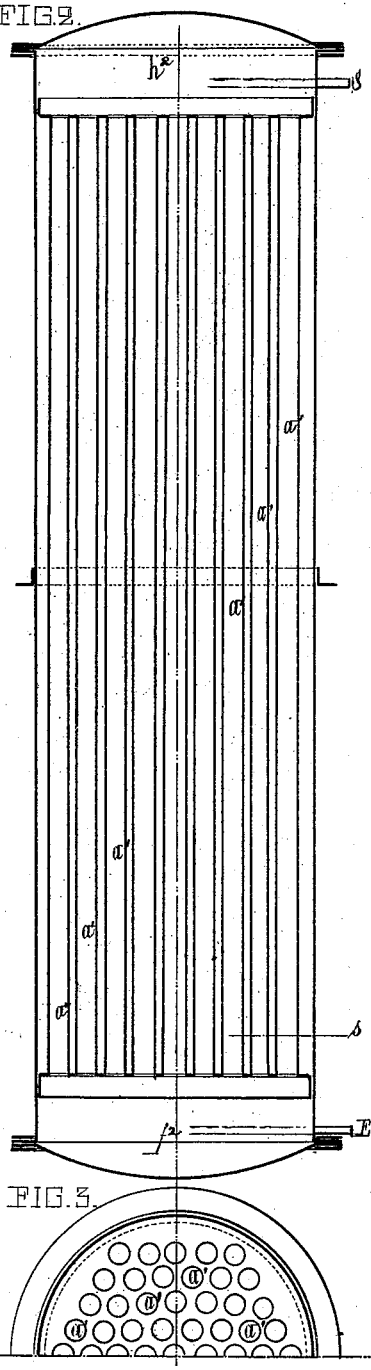
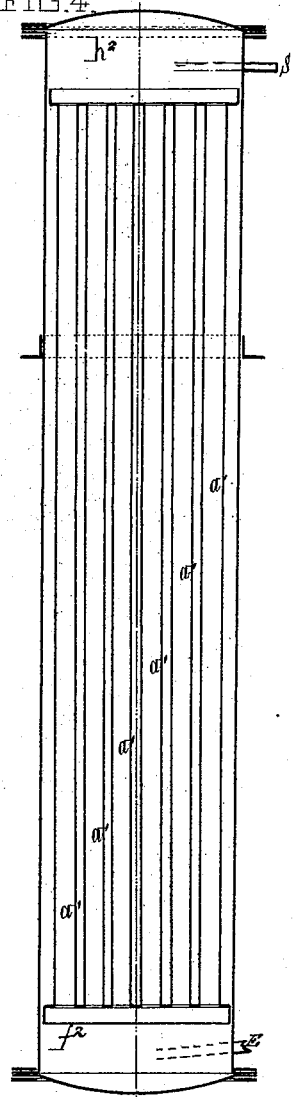
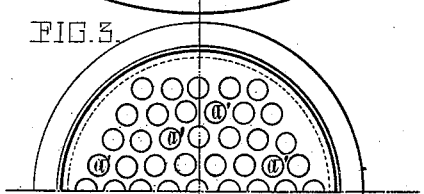
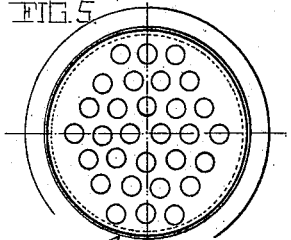

(No Model.) 4 Sheets—Sheet 3.
G. GUIGNARD.
PROCESS OF AND APPARATUS FOR MANUFACTURING PURE YEAST.
No. 471,335. Patented Mar. 22, 1892.
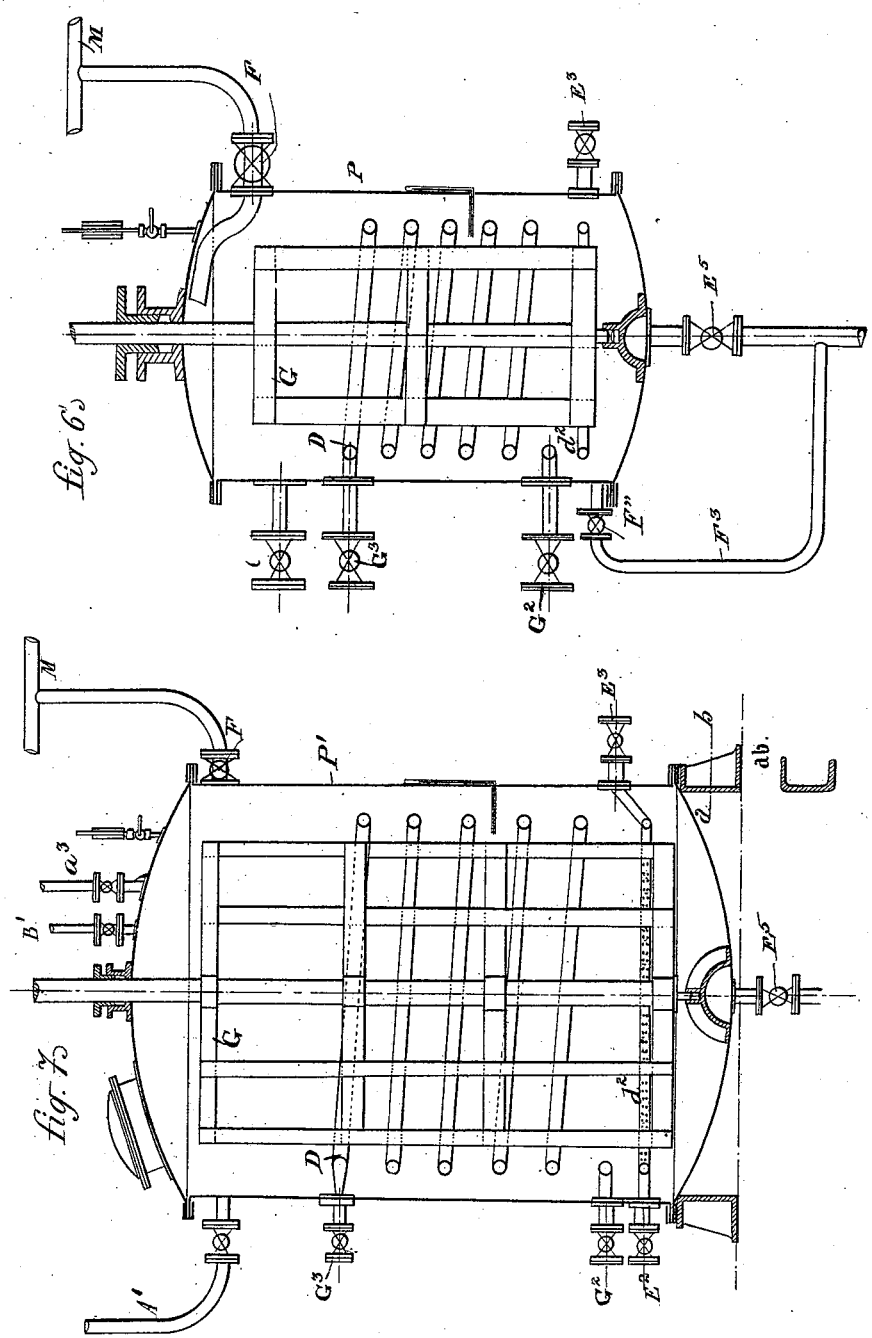

(No Model.) 4 Sheets—Sheet 4.
G. GUIGNARD.
PROCESS OF AND APPARATUS FOR MANUFACTURING PURE YEAST.
No. 471,335. Patented Mar. 22, 1892.
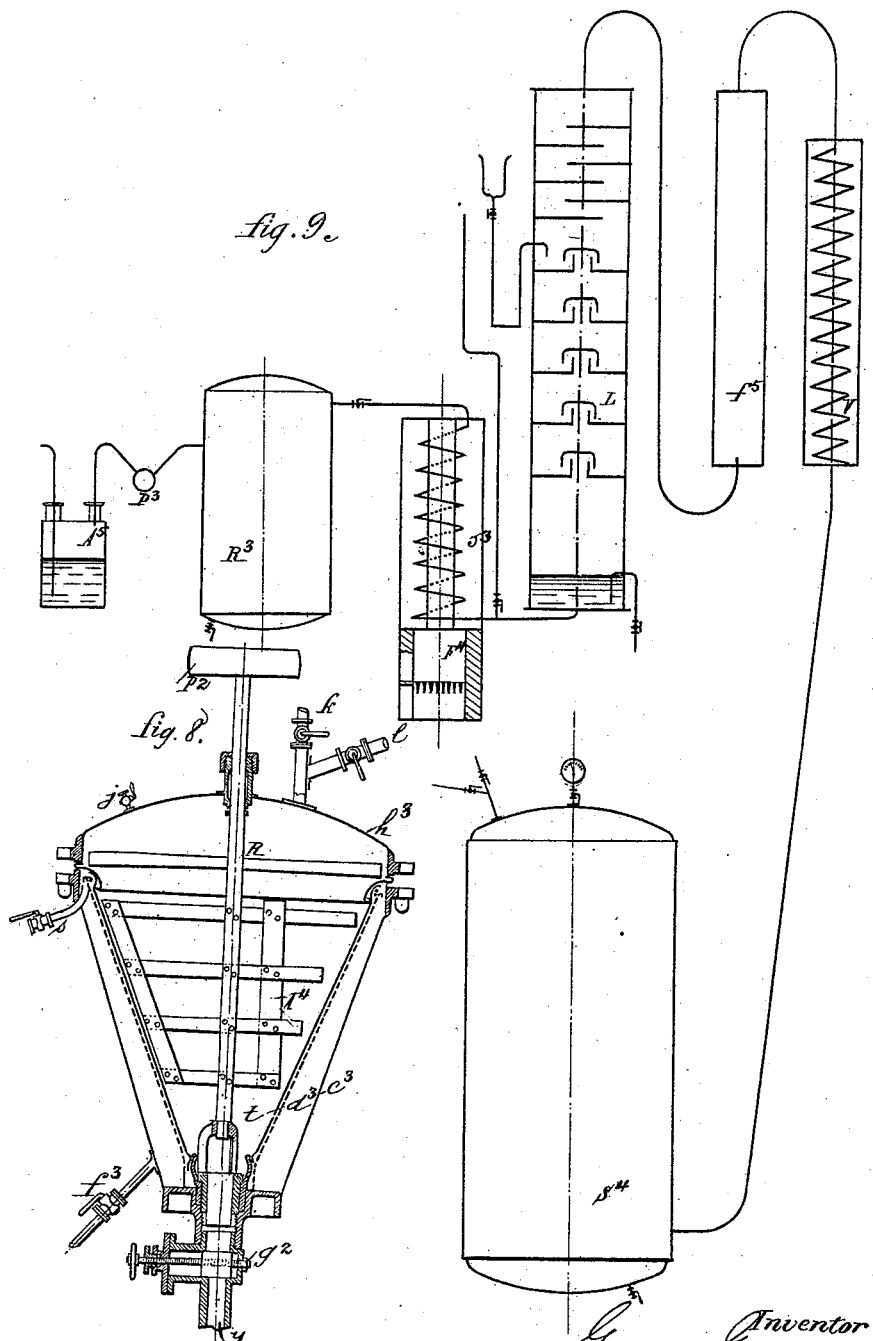

UNITED STATES PATENT OFFICE.

GASTON GUIGNARD, OF PARIS, ASSIGNOR TO THE SOCIÉTÉ ANONYME LA LEVURE, OF JUVISY, FRANCE.

PROCESS OF AND APPARATUS FOR MANUFACTURING PURE YEAST.

SPECIFICATION forming part of Letters Patent No. 471,335, dated March 22, 1892.

Application filed August 19, 1891. Serial No. 403,473. (No model.)

*To all whom it may concern:*

Be it known that I, GASTON GUIGNARD, a resident of Paris, France, have invented a certain new and useful Improvement in the Process of and Apparatus for Manufacturing Pure Yeasts, which improvement is fully set forth in the following specification.

This invention relates to a new industrial process for manufacturing and preserving pure yeasts. This process is grounded on the observation of the following facts: A pure yeast sowed while sheltered from the air in a fermentable sugary wort multiplies, always remaining in pure condition and converting the sugar into alcohol and carbonic acid. In any fermentation for a given wort the quantity of yeast which is generated is in the ratio of the amount of oxygen flowing into the wort during the fermentation, so that the production of yeast is accelerated by blowing air into the worts. In my process the air is previously sterilized as well as the worts.

These facts being established, the said process consists in the following operations: first, in sterilizing a fermentable sugary or sweet wort; second, in sowing and causing the fermentation in presence of sterilized air of this wort by a pure yeast cultivated by any suitable method; third, in blowing sterilized air during the fermentation and at certain moments of the same in order to increase the production of yeast; fourth, in separating the wort from the yeast and subsequently incorporating the yeast in a gelatined or "gelosed" wort in order to insure its preservation, these operations being carried on without the contact of unsterilized air.

The results obtained by this process are (*a*) the multiplication of a given yeast which will always remain pure and in the same condition; (*b*) the indefinite preservation of the yeast thus obtained; (*c*) the transformation of the worts into a liquor containing pure ethylic alcohol without any mixture of aldehydes or any other superior alcohol.

The drawings annexed to this specification show the various apparatus devised and adapted for use in carrying out my process.

Figure 1 represents a vertical section of the apparatus for sterilizing the worts. Figs. 2 and 3 are vertical section and plan views showing the arrangement of the first cooler. Figs. 4 and 5 are vertical section and plan views showing the second cooler, which is substantially identical with the first. Fig. 6 illustrates the yeast-vat in vertical section. Fig. 7 is a vertical section of the fermenting-vat. Fig. 8 is a vertical section of the yeast-filter. Fig. 9 shows the arrangement of apparatus for sterilizing air. Fig. 10 shows means for the introduction of the pure yeast into cans. Figs. 11 and 12 illustrate details of construction.

The following is a description of the several apparatus employed and the operations to be carried on.

*Sterilization of the worts.*—The sweet worts designed to produce pure yeast are contained in a copper vessel A, Fig. 1, the height of which exceeds its diameter. At its lower part the vessel A is provided with a double casing B, into which heating-steam is conveyed through the upper lateral cock *f*. The pipe *g*, situated at the lower part of the double casing B, serves for draining the water of condensation. The wort enters the vessel A through the tube *d*, provided with a cock, and escapes, after having been sterilized, through the tube *e*, having an extension *e'* reaching to the bottom of vessel A.

*Operation of the apparatus.*—Having filled the vessel A with wort to its full capacity, the heating-steam is led into the double casing B. The stirring of the liquid is effected by the action of the heat, the lower part only of the vessel A being heated. At the upper part of A is a cock *a*, which is open during the heating and allows the air to escape. After escapement of the air the cock *a* is turned off, and the whole is brought up to the temperature of 115° centigrade, which is maintained for twenty minutes. After this the liquid is expelled through the tube *e e'* by using for the purpose a pressure of steam or sterilized air, which enters, respectively, through the cock *b* or *c* of the upper tube *h*, placed on the vessel A. The wort thus sterilized should be cooled, and it is advantageous to recover the heat contained in the same. For this purpose when the liquid escapes from the tube *e* of vessel A it is conveyed successively into two tubular clusters, in which it is cooled by interchanging heat, first, with unsterilized wort to be used for a subsequent operation, and, second, with cold water intended to prepare other worts which are to appear in the treatment.

*Cooling of the sterilized worts.*—Figs. 2, 3, 4, and 5 show the arrangement of the tubular clusters where this interchanging of heat takes place. $a'\ a'\ a'$ are the tubes of the cluster, through which the wort passing from vessel A circulates. $h^2 f^2$ are the upper and lower chambers for the reception of cold water or cold unsterilized wort. Chamber $f^2$ is provided with an outlet, as at E, and chamber $h^2$ with an outlet at S.

*Sowing with yeast.*—From the coolers the sterilized wort, forced by a pressure of steam or sterilized air, enters the yeast-vat or the fermenting-vat. As seen in Figs. 6 and 7, the yeast and fermenting vats are copper vessels P P', respectively, entirely closed, in each of which are an agitator G, provided with paddles, and a coiled pipe D, adapted for the circulation of cold water for the purpose of keeping the temperature during the fermentation constantly below 27° centigrade. Cock $G^2$ controls the inlet and cock $G^3$ the outlet of coil D. As these two vessels are in many respects similar, the same reference-letters are used on corresponding parts. A coil $d^2$, located at the bottom of these vats, allows either sterilized air or steam to be admitted by the cocks $E^3$ and $E^4$, respectively.

*Operation of said apparatus.*—All the cocks being turned on, the apparatus is sterilized by a current of superheated steam, which is led through the cock $E^2$ during about twenty minutes at a temperature of about 120° centigrade after the exit of all the air. Thereupon the apparatus is cooled and the steam-inlet $E^2$ is closed, and the cock in pipe A' is opened to admit the worts from the cooler. During the fermentation the steam-inlet $E^2$ is closed and cock $E^3$ is opened to admit sterilized air, which is forced under pressure through the mass in the vat, thereby greatly increasing and expediting the production of the yeast, as already explained. B' is an escape-cock for the air or steam, and is closed when the fermentation begins, at which time the cock F is opened, and through it the carbonic acid and water generated in the vat pass into a general piping M, the end of which may be submerged in an antiseptic liquor—such, for example, as a solution of corrosive sublimate. By this means unsterilized air is prevented from flowing back. The cock $a^3$ is used to control the admission of sterilized air at the top of the vat to aid in the expulsion of the matters therein by the exit-pipe at the bottom controlled by cock $E^5$. All that has been stated above relates to the fermenting-vat P' and applies also the yeast-vat P. The only difference consists in introducing in this latter a pure yeast cultivated separately according to any method. For each vat holding one hectoliter a Pasteur balloon of ten liters has been prepared containing the yeast. The discharge-tube of this balloon is connected by means of a rubber pipe with the opening Q of the yeast-vat, from which all the air has been expelled by a current of steam, which in condensing subsequently produces a vacuum in consequence of the cooling due to the passage of the cold air in the coil. Fifteen liters of sterilized wort are first caused to pass, and then the yeast, the air flowing back into the balloon through a curved tube, the end of which is kept in a flame. The yeast is therefore introduced into the yeast-vat without any backflowing of unsterilized air, and is thus preserved in an absolutely pure state. The fermentation is facilitated by admitting sterilized air under pressure. When all the air-cocks have been turned off and the pressure rises, the flowing of sterilized air is stopped and the fermentation is allowed to set up. A thermometer is used to ascertain the temperature, which is kept as far as possible constant by causing a current of cold water to pass in the coiled pipe D. In the apparatus there should be always a pressure exceeding that of the atmosphere, so as to prevent any backflowing of unsterilized air. The exit-pipe $F^3$ of the yeast-vat enters the latter a little above the bottom thereof, and when cock F'' in this pipe is opened to drain the vat there is left at the bottom of the latter a small quantity of mother-liquor. For the complete drainage of the vat the cock $E^5$ is used. The fermentation being completed, the wines are filtered in a special filter. (Represented in vertical section, Fig. 8.) This filter is composed of a conical box $c^3$, in which is contained a kind of funnel $d^3$, made of perforated sheet metal or wire-netting, over which is stretched a cloth $t$. In the center is an agitator $A^4$ and at the bottom is a discharge-tube $y$ for the exit of yeast after filtration. This pipe is provided with a valve $g^2$. A cock $f^3$ serves for the outlet of fermented wort. A cover or cap $h^3$ is secured to the upper part by rotation bolts and is traversed in a stuffing-box by shaft R of agitator $A^4$, rotated by a pulley $P^2$. The pipe $k\,l$ serves for the admission of the sterilized air or the steam. $s$ is an eduction-cock. $j$ serves for the admission of the worts and the yeast coming from the fermenting-vats. As already stated, the fermented worts or the wines run out at $f^3$. These are then treated for extraction of ethylic alcohol contained therein. As to the yeast on the filter, it is mixed with a wort made separately and composed of ordinary grain wort, five to fifteen per cent., and of gelatine or gelose. This wort is saturated and sterilized for about twenty minutes. The mass is stirred in the filter by means of the agitator, which rubs it against the filter-cloth $t$. When the brewing is about to cease, the mixture inside the filtering-surface $t$ is caused to pass into a second mixer similar to the first one, into which is further introduced a certain quantity of wort. The cans $m$, Fig. 10, in which the yeast is to be preserved, should be made of tinned sheet-iron and provided with two tubes n o, the one emerging to the bottom and the other serving as a discharge-tube. Tube o is closed by a cotton stopper and tube n by a rubber tube n', also filled with a cotton stopper. The cans have been previously heated in a drying-stove up to 120° for two hours.

*Operation for introducing the yeast in the can, Fig. 10.*—First, turn on the steam-cock W, situated at the tube z of the yeast-mixing receiver T, and, second, open also quickly the tube n of the can by removing the cotton. By turning cock W and opening cock R' the can is brought into communication with the tube connected at the mixer T and the yeast and wort fall in the can. Cock R' is then closed, the can is removed from the tube z, the rubber-pipe is quickly closed with a tapering wooden stopper, and then this tube is dipped in a little wax. The whole is brought to the drying-stove and the fermentation is allowed to set up again. It is then withdrawn from the stove, and when the gelatine is cooled the second tube o is removed from the can and the aperture closed. The can is then ready for shipment.

As shown in Figs. 10 and 11, the levels are indicated by a float connected to the balance-weight 6 by a string 7. The weight slides in a glass tube 8, cemented on a copper box 9, containing the pulleys 10. The cocks are all placed in cups 12, containing antiseptics, as shown in Fig. 12.

The apparatus for sterilizing the air is represented in Fig. 9. It comprises, first, a washer $A^5$, containing an antiseptic; second, a pump $P^3$, drawing the air washed in A; third, an air-tank $R^3$ with three kilograms pressure; fourth, a coiled pipe $s^3$, in which circulates the air, which is sterilized therein by the heat arising from a furnace $F^4$; fifth, a washer L, containing sulphuric acid, composed of a column with plates and opposing partitions; sixth, a cotton filter $f^5$; seventh, a cooler V, and, eighth, an air-tank $S^4$, sterilized with a pressure of three kilograms and from which the air is led to an outer apparatus, as required.

I claim—

1. The process of manufacturing pure yeast by sterilizing a sweet wort, sowing this wort with a pure yeast, blowing in sterilized air during the fermentation, thereby increasing the production of yeast, and separating the yeast from the wort and incorporating with the yeast a gelatined or gelosed wort, these operations being conducted out of contact with unsterilized air, substantially as described.

2. The process of manufacturing and preserving pure yeast by sterilizing a sweet or sugary wort, sowing with pure yeast, blowing in sterilized air during the fermentation, separating the wort from the yeast by filtration, and mixing or incorporating with the latter a gelatined or gelosed wort and inclosing it in cans, the several operations being conducted out of contact with unsterilized air, substantially as described.

3. In apparatus for manufacturing pure yeast, the combination, with yeast and fermenting vats, substantially as described, of a filter for separating the yeast and wort, and a mixer for receiving the yeast from the filter and provided with a steam-injecting pipe and with a tube for delivering the yeast into cans, said vessels being all closed against the admission of unsterilized air, as set forth.

4. In apparatus for the manufacture of yeast, the combination, with the fermenting and yeast vats, of an air-sterilizing apparatus comprising a washer, a pump, a receptacle, a heater, a washing column, a cooler, and a reservoir, all connected serially and closed against external air, substantially as described.

In testimony whereof I have signed this specification in the presence of two subscribing witnesses.

GASTON GUIGNARD.

Witnesses:
ROBT. M. HOOPER,
JOSEPH TOURNIER.